C. STONE.
GEAR WHEEL.
APPLICATION FILED JULY 27, 1920.
1,394,127. Patented Oct. 18, 1921.
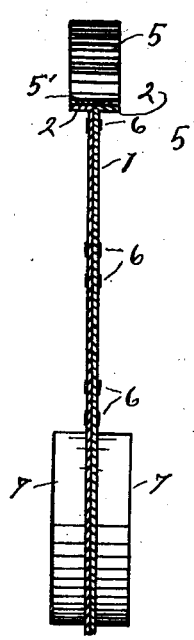
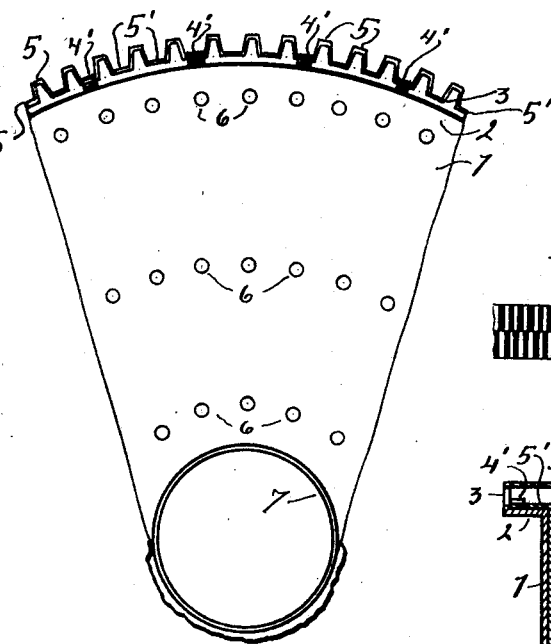
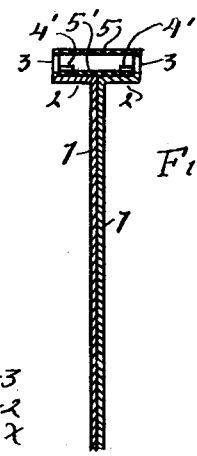
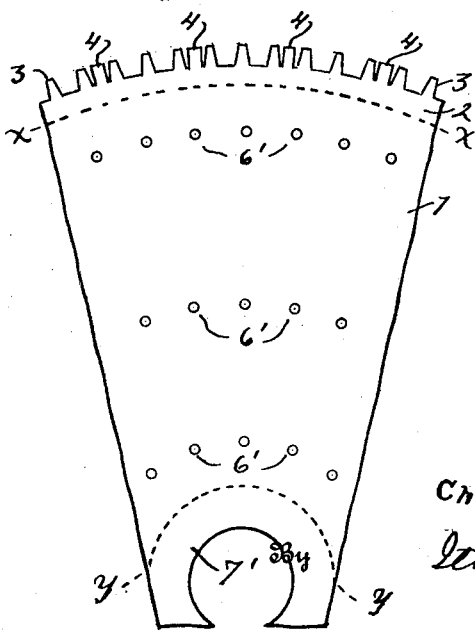
Inventor
Charles Stone,
Ithiel J. Cilley
Attorney

UNITED STATES PATENT OFFICE.

CHARLES STONE, OF DETROIT, MICHIGAN.

GEAR-WHEEL.

1,394,127.  Specification of Letters Patent.  Patented Oct. 18, 1921.

Application filed July 27, 1920. Serial No. 399,263.

*To all whom it may concern:*

Be it known that I, CHARLES STONE, a citizen of the United States, residing at Detroit, in the county of Wayne and State of Michigan, have invented certain new and useful Improvements in Gear-Wheels, of which the following is a specification.

My invention relates to improvements in the manner of constructing gear wheels, and its objects are: first, to provide a means whereby strong, effective gear wheels may be made wholly by press work; second, to provide a means whereby the surfaces of the gear wheel teeth may be rendered nearly nonfrictional in their action upon each other when two wheels are laboring together; third, to render the constructed wheels as light as possible; fourth, to insure interengagement of the teeth with the least possible expense both in material and labor, and, fifth, to provide a means whereby teeth set upon the surfaces of auxiliary teeth as supporting elements may be securely connected with said supporting elements.

I attain these objects by the mechanism and construction shown in the accompanying drawing, in which Figure 1 is an elevation of a segment of a wheel with my construction shown. Fig. 2 is a transverse sectional view of the same. Fig. 3 is an elevation of a segment of the material from which the supporting element in my wheel is made. Fig. 4 is a transverse section of the same partly formed, and showing a transverse sectional view of the crown and base of the teeth as formed for my line of construction. Fig. 5 is a plan of the wheel showing the teeth staggered on the two edges of the wheel.

Similar numerals indicate similar parts wherever placed upon the drawings.

In the construction of this gear wheel I make use of sheet metal for forming the web 1 which is made in two parts as indicated in Figs. 2 and 4, each piece bent practically upon the line $x$—$x$ of Fig. 3 to form the flanges 2, and upon the periphery of these flanges I form supporting teeth 3 and retaining clasps 4, which are positioned at right angles with the flanges. The two parts of the web 1 are secured together in any available manner, as by rivets 6 passed through the holes 6' and properly riveted in place. The hub of the wheel is pressed from the web plates 1, practically on the line $y$—$y$ of Fig. 3.

When the web 1 has been properly secured together, with the hub 7 struck from the center of the web, and the flanges 2 and teeth 3 are in proper form I make a geared surface covering for the teeth, out of sheet metal, as indicated at 5, 5', and pass it over the supporting teeth 3, and secure it in place by folding the securing elements 4 down into the valleys 5' of the gear coverings, as at 4'. These securing elements may be formed and used between each pair of teeth on the periphery of the wheel, or they may be secured at regular intervals, as indicated in Fig. 1.

The sheet metal used for forming the teeth of the wheel should be as hard as can be safely formed into the teeth covering, and as nearly perfectly smooth as the surface can be made, to avoid friction and wear.

In Fig. 5 I have shown the teeth as formed from a single sheet of metal but staggered, which I find to be a very desirable line of construction as providing a more constant working of the teeth and with much less noise than would be possible with single teeth across the entire face of the wheel, as indicated in Figs. 2 and 4.

While the web and flange portion of the wheel may be made of cast metal I greatly prefer the use of sheet metal, as with sheet metal the entire wheel may be made upon a punch press.

In the construction of this wheel the retaining elements 4 are not offset at the time the teeth 3 are, but are left projecting directly from the flange 2, so the sheet metal teeth covering 5, 5', may be readily slid over the supporting teeth 3, and then the securing elements 4 are pressed over and flattened upon the surface of the valleys 5' as hereinbefore described. This renders it possible to fully form and secure the casing or covering 5, 5' before placing it upon the supporting teeth, which could not be done if the supporting elements were formed at right angles with the teeth in the first instance.

I find this construction especially adapted for use upon the feed screw upon engine lathes, as it seems to produce a much smoother action, and with much less jar than is possible with the use of an ordinary spur gear, and the cost of construction is much less.

Having thus fully described my invention, what I claim as new in the art, is:

1. In gear wheel construction, a web made of sheet metal and having a hub and flange formed thereon, supporting teeth formed upon the flange and positioned at right angles therewith, securing elements formed upon the flange, teeth casings formed of sheet metal and mounted upon the supporting teeth, and the securing elements folded over the edges of the casing and pressed firmly into the valleys between the teeth.

2. In gear wheel construction, a web made of two plates of sheet metal secured together and having a central hub struck out to each side of the web, a flange turned at right angles with each plate of the web, supporting teeth formed upon the flanges and positioned at right angles therewith, securing elements projecting from the edges of the flanges, an endless circle of teeth coverings formed of sheet metal and passed over the supporting teeth, and the securing elements folded over and impressed firmly between the teeth of the casing.

Signed at Detroit, Michigan, July 22, 1920.

CHARLES STONE.